US006775967B2

(12) United States Patent
Wübbels

(10) Patent No.: US 6,775,967 B2
(45) Date of Patent: Aug. 17, 2004

(54) CROP HARVESTER HEADER FOR MOWING STALK-LIKE CROP

(75) Inventor: Richard Wübbels, Rhede (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/281,445

(22) Filed: Oct. 25, 2002

(65) Prior Publication Data

US 2003/0084654 A1 May 8, 2003

(30) Foreign Application Priority Data

Oct. 26, 2001 (DE) ........................................ 101 52 984
Dec. 5, 2001 (DE) ........................................ 101 59 728

(51) Int. Cl.[7] ................................................ A01D 45/02
(52) U.S. Cl. ................................. 56/60; 56/101; 56/51
(58) Field of Search ............................. 56/51, 53, 101, 56/60, 94, 99, 100, 102

(56) References Cited

U.S. PATENT DOCUMENTS

| | | | | |
|---|---|---|---|---|
| 4,236,369 A | * 12/1980 | Decoene | ........................ | 56/60 |
| 5,852,922 A | * 12/1998 | Over Behrens et al. | ...... | 56/14.7 |
| 6,073,429 A | * 6/2000 | Wuebbels et al. | ........... | 56/11.3 |
| 6,298,643 B1 | * 10/2001 | Wuebbels et al. | ............. | 56/60 |

FOREIGN PATENT DOCUMENTS

| | | |
|---|---|---|
| DE | 40 02 344 A | 1/1990 |
| DE | 199 53 521 A | 11/1999 |
| EP | 0 760 200 A | 6/1996 |
| EP | 0 860 106 A | 1/1998 |
| EP | 1 010 363 | 10/1999 |
| EP | 1 008 291 A | 11/1999 |

* cited by examiner

*Primary Examiner*—Thomas B. Will
*Assistant Examiner*—Meredith Petravick

(57) ABSTRACT

A crop harvester header includes a plurality of intake and mowing drums mounted in side-by-side relationship to each other across the width of the header. Located to the rear of the intake and mowing drums for receiving crop delivered to the rear by them are a pair of slope conveyor drums respectively located on opposite sides of a longitudinal center plane of the header and at opposite sides of an inlet passage leading to feed rolls for introducing the crop into a chopper drum of the harvester. The pair of slope conveyor drums are respectively located adjacent an inner pair of the intake and mowing drums that are respectively located on opposite sides of the center plane and located between, and at least nearly along a line of centers of, each slope conveyor drum and an intermediate intake and mowing drum located outwardly of an adjacent inner intake and mowing drum, is a transverse conveying drum having tooth-shaped drivers disposed in overlapping relationship to tooth-shaped drivers of the slope conveyor and intermediate intake and mowing drums.

7 Claims, 4 Drawing Sheets

CROP HARVESTER HEADER FOR MOWING STALK-LIKE CROP

FIELD OF THE INVENTION

The invention concerns a crop harvester header for mowing stalk-like crop, the header including several intake and mowing drums mounted to the header frame in side-by-side relationship to each other for cutting and conveying the harvested crop, and further including deflecting conveying drums arranged behind the intake and mowing drums, in the direction of operation, that are arranged to take over and convey the harvested crop centrally into an intake channel of a harvesting machine, as well as transverse conveying drums arranged behind the intake and mowing drums that are provided to take over the harvested crop from at least one of the intake and mowing drums and to convey it further to the deflecting conveying drum, where the enveloping circle of each of the transverse conveying drums and the enveloping circle of a respective one of the intake and mowing drums overlap.

BACKGROUND OF THE INVENTION

DE 40 02 344 A proposes a header or front attachment implement that is composed of conveying drums with vertical axes of rotation preceded by several supply rolls. The supply rolls cut the crop. At the rear sides of the supply rolls, the cut crop is taken over by the conveying drum which conducts it to the intake rolls of a chopper drum of a forage harvester in interaction with the supply rolls that follow downstream. In another embodiment, four conveying drums are mounted in side-by-side relationship to each other and operate to transfer the cut crop to a transverse screw conveyor. The enveloping circles of the conveyor drums and the supply rolls, as well as adjoining supply rolls, overlap.

DE 199 53 521 A shows a cutting and conveying arrangement for stalk-like cereal crop that is provided with four cutting and conveying rotors arranged in side-by-side relationship to each other. The crop taken up by the cutting and conveying rotors is extracted by rotating clean-out devices from the pocket-shaped recesses of the cutting and conveying rotors. A transverse screw conveyor transports the crop to the center of the machine from which it is conducted to a chopper drum of a forage harvester. Intermediate conveying rotors are arranged between the outer cutting and conveying rotors and the transverse screw conveyor, whose enveloping circle overlaps the enveloping circle of the rotating clean-out devices.

U.S. Pat. No. 5,722,225 discloses a header for the mowing of stalk-like harvested crop in which several intake and mowing drums are distributed over the operating width. The crop is transported inward on the rear side of the intake and mowing drums along the rear wall, where it is conveyed by transverse conveying drums in the valley region between adjoining intake and mowing drums, the conveying drums including driver elements that extend through slots in the rear wall. The inner intake and mowing drums transfer the crop to a slope conveyor drum whose axis of rotation is inclined forward, that bridges the vertical distance between the plane of the operation of the intake and mowing drums and the plane of the intake passage of the following chopper drum of a forage harvester.

EP 1 008 291 A proposes a machine for mowing stalk-like cereal crop that is equipped with several drum-shaped take-up elements distributed over the operation width that take up and convey the harvested crop. The crop is conducted by the take-up elements to an independent transverse conveyor that is arranged behind the take-up elements as seen in the direction of operation. The transverse conveyor conveys the crop along a guide wall that is arranged immediately behind the take-up elements. The transverse conveyor uses conveyor belts or conveyor drums that are equipped on their circumference with driver elements in the shape of a set of gear teeth. The enveloping circles of adjoining driver elements overlap. The conveyor drums arranged furthest inward deflect the crop to the rear and convey it into the intake channel of the chopper drum of a forage harvester.

The machine disclosed by U.S. Pat. No. 5,722,225 has the advantage of a short configuration due to the fact that the transverse conveying drums interact with the intake and mowing drums, so that the chopper drum of a forage harvester carrying it need absorb only a relatively small amount of torque. Due to the fact that the transverse conveyors operate independently of the intake and mowing drums, the machines according to EP 1 008 291 A and DE 199 53 521 A are considerably longer and apply a greater load to the chopper drum of a forage harvester. The configuration according to DE 40 02 344 A cannot be used with machines that have operating widths such as those of the aforementioned machines.

The problem underlying the invention is seen in the need to improve the flow of the crop in a compact machine for the mowing of stalk-like harvested crops.

SUMMARY OF THE INVENTION

According to the present invention, there is provided a header for the mowing of stalk-like crop equipped with a plurality of side-by-side intake and mowing drums deflecting conveying drums located behind the intake and mowing drums, as well as transverse conveying drums arranged behind the intake and mowing drums so as to take over the harvested crop from at least one of the intake and mowing drums, with the enveloping circle of a given transverse conveying drum overlapping the enveloping circle of an associated deflecting conveying drum.

In this way, the result is an improvement of the transport of the crop. The transfer of the crop from the transverse conveying drums to the respective associated deflecting conveying drums is performed without any problems.

The deflecting conveying drum can operate as a crop take-out or stripping device for the associated transverse conveying drum, that is, it extracts the crop from it. Thereby a separate crop take-out or stripping device for each of the transverse conveying drums can be omitted.

The deflecting conveying drum is, in particular, a slope conveyor drum, that is provided with an axis of rotation inclined slightly forward and that raises the crop into the intake channel of the header. However, the use of an endless conveyor equipped with tensioning means (chains or belts) as a deflecting conveying unit is also conceivable. A slope conveyor drum is preferably equipped with conveyor disks arranged one above another, about whose circumference drivers are distributed. These drivers may be provided with an aggressive conveying performance in order to attain the result that the crop is actively extracted from the transverse conveying arrangement. For this purpose, the drivers may be provided with a surface leading in the direction of rotation that extends approximately radially.

The transverse conveying units are each preferably a transverse conveying drum with an approximately vertical axis of rotation, although the use of an endless conveyor equipped with tensioning means (chains or belts) would also be possible. The transverse conveying drum can also be equipped with conveyor disks arranged one above another, that are provided with drivers. Most appropriately, the drivers of the transverse conveying drums are provided with a rejecting conveying performance so that the deflecting conveying unit can easily extract the crop from the associated transverse conveying drum. Such a performance can be attained by a curvature of the drivers trailing opposite the direction of rotation. The overlap of the enveloping circles of the associated deflecting and conveying drums can be attained by having the drivers of each arranged with an offset to each other vertically and/or azimuthally. The drivers for the deflecting conveying unit and/or the transverse conveying arrangement as described can also be applied to headers for the mowing of stalk-like harvested crop whose transverse conveying drums do not overlap the enveloping circle of the associated deflecting conveying drums and/or one of the intake and mowing drums where the transverse conveying drum and/or the deflecting conveying drum may be configured as endless conveyors instead of drum conveyors, if desired.

The header, according to the invention, is provided with at least two intake and mowing drums. As a rule, an inner intake and mowing drum is arranged directly alongside the longitudinal center plane of the header and a second intake and mowing drum on the same side of the machine is arranged further outward and beside the inner intake and mowing drum. The transverse conveying drum is preferably arranged in such a way that its enveloping circle overlaps the enveloping circle of the second intake and mowing drum from the center of the header. It is conceivable that, in addition, it could also overlap the enveloping circle of the inner intake and mowing drum. The enveloping circle of the deflecting conveying drum may also overlap the enveloping circle of the inner intake and mowing drum. In particular, if the header is provided with an uneven number of intake and mowing drums, the intake and mowing drum characterized here as the inner intake and mowing drum may be offset to the side with respect to the longitudinal center plane of the header.

BRIEF DESCRIPTION OF THE DRAWINGS

The drawings show three embodiments of the invention that shall be described in greater detail in the following.

DESCRIPTION OF THE PREFERRED EMBODIMENTS

Figure 1:
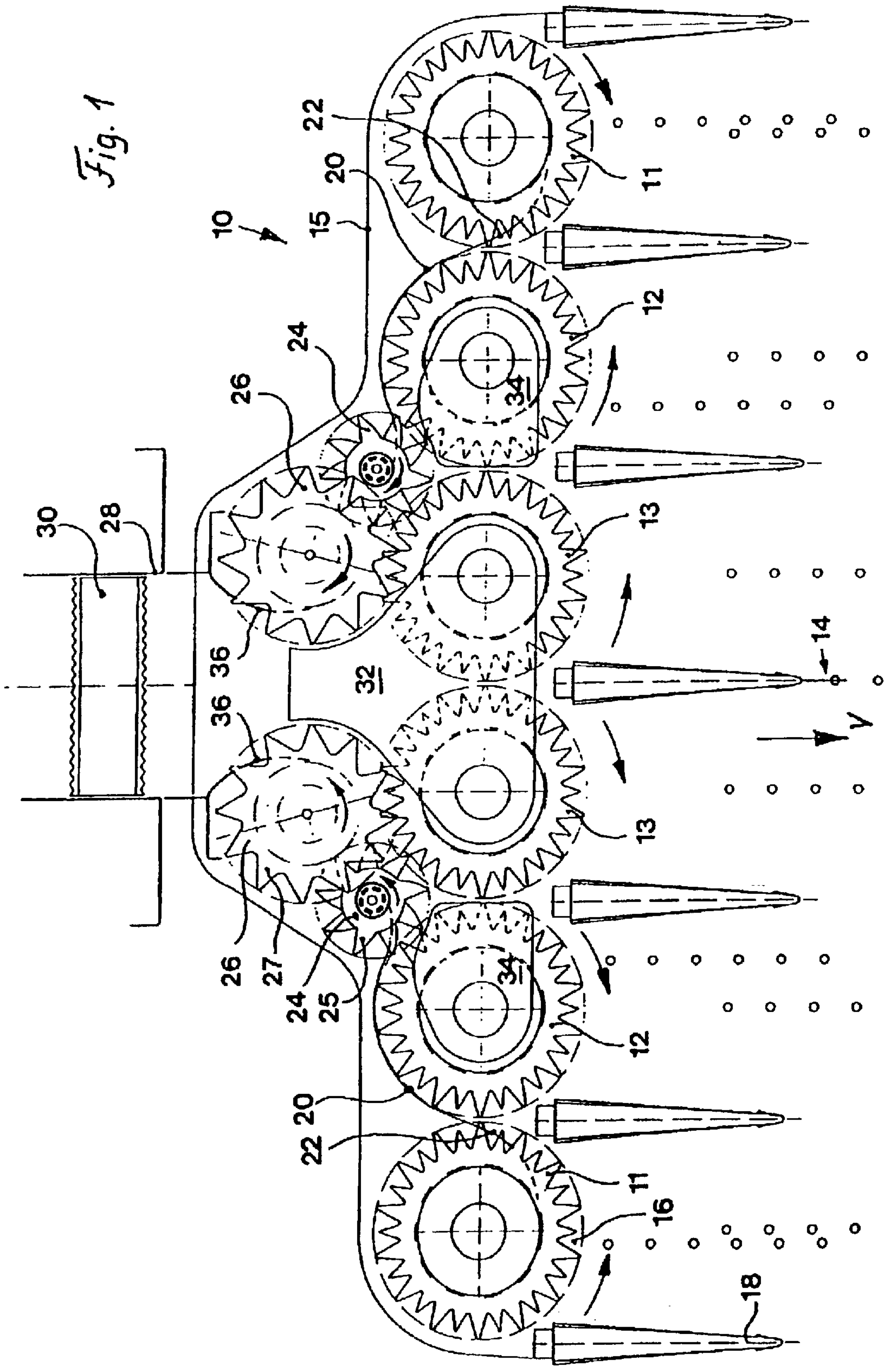
FIG. 1 is a plan view of a crop harvesting header of a forage harvester for mowing stalk-like crop constructed in accordance with a first embodiment of the invention.

Referring now to FIG. 1, there is shown a header 10 for the mowing of stalk-like crop which includes six intake and mowing drums 11, 12, 13 at each side of, and arranged symmetrically about, a longitudinal center plane 14 of the header. The mowing drums 11, 12, 13 are supported on a frame 15.

The intake and mowing drums 11, 12, 13, that operate independent of rows, are each composed of a lower cutting disk 16 that rotates about an approximately vertical axis and conveying disks arranged coaxially above the cutting disk 16, whose circumference is equipped with pocket-shaped recesses. The cutting disks 16 separate the upper parts of the harvested crop from the stubble remaining in the ground. The stalks of the harvested crop, which usually is corn, are taken up and retained in the pocket-shaped recesses of the conveyor disks.

The intake and mowing drums 11, 12, 13 are preceded by stalk dividers 18. Between the rear side of the intake and mowing drums 11, 12, 13 and a rear wall 20 of the header 10 that conforms to the shape of the intake and mowing drum 12, a transverse conveying channel is formed through which the crop harvested by the intake and mowing drums 11, 12, 13 is transported to the side towards the center of the header 10.

The two outer intake and mowing drums 11 are brought into rotation in such a way that the harvested crop is conveyed first to the side in the direction towards the longitudinal center plane 14 and then to the rear against the direction of operation V of the header 10. There, the harvested crop is taken over by the adjacent intake and mowing drums 12. This intake and mowing drum 12 rotates in the opposite direction to the adjoining outer intake and mowing drum 11, so that it conveys the harvested crop first to the outside, and following that, to the rear. On its side facing the outer intake and mowing drum 11, the intake and mowing drum 12 takes over the harvested crop from the outer intake and mowing drum 11. A crop take-out or stripping device 22, composed of sheet metal parts which intrude into the enveloping circle of the outer intake and mowing drum 11 and extract the harvested crop from the pocket-shaped recesses of the outer intake and mowing drum 11, performs the transfer of the harvested crop to the intake and mowing drum 12, on whose rear side the harvested crop is conveyed to the inside in interaction with the rear wall 20 in the direction towards the longitudinal center plane 14.

Following this, the harvested crop is extracted by a crop take-out or stripping device, not shown, from the pocket-shaped recesses of the intake and mowing drum 12 and taken over by a rotating transverse conveying drum 24 with an approximately vertical axis of rotation that is used as a transverse conveying arrangement. The transverse conveying drum 24 is composed of a cylindrical body with conveyor disks fastened in it one above another, about whose circumference drivers 25 are distributed for the conveying of the crop. The drivers 25 are provided with a surface that is leading in the direction of rotation which is curved opposite to the direction or rotation. Therefore, it has a rejection-conveying performance or characteristic. In place of the tooth-shaped drivers 25, fingers could also be used. Each of the transverse conveying drums 24 on both sides of the machine is arranged in the valley region between the rear sides of the central intake and mowing drum 12 on each side of the header 10 and the inner intake and mowing drum 13. The drivers 25 located upstream of the axis of rotation of the transverse conveying drums 24 penetrate slots in the rear wall 20. The rear wall 20 ends in the vicinity of the cylindrical body of the transverse conveying drum 24.

In the embodiment shown in FIG. 1, the inner intake and mowing drums 13 rotate in the same direction as the adjoining intake and mowing drums 12. The harvested crop taken up by them is therefore also conveyed first to the outside and then to the rear. It is thereby conveyed further in interaction with the transverse conveying drum 24, whose enveloping circle overlaps the enveloping circle of the inner intake and mowing drums 13 and the next outer intake and mowing drums 12.

Behind the two inner intake and mowing drums 13, as seen in the direction of operation V, slope conveyor drums 26, that are provided as deflecting conveying units, are arranged that have axes of rotation inclined forward that convey the harvested crop to the rear into an intake channel 28 of the chopper drum of a forage harvester with intake rolls 30 arranged therein one above another. The slope conveyor drums 26 are composed of cylindrical bodies with conveyor disks arranged thereon one above another that are equipped with drivers 27 for the transport of the crop. The surfaces of the drivers 27 of the slope conveyor drums 26, that are leading in the direction of rotation, are arranged approximately radially, resulting in an aggressive conveying performance or characteristic. In place of the tooth-shaped drivers 27, fingers could also be used. A control of the drivers 25 and/or 27 is also conceivable that performs a radial shifting and/or an azimuthal rotation of the drivers 25 and/or 27, in order to improve the transfer and conveying of the crop.

The enveloping circle of the transverse conveying drum 24 and the enveloping circle of the slope conveyor drum 26 overlap in order to optimize the transfer of the crop. The result is that the slope conveyor drum 26 takes over the harvested crop from the transverse conveying drum 24, where separate crop take-out or stripping devices for the transverse conveying drum 24 are not required. Furthermore, the enveloping circle of the slope conveyor drum 26 overlaps the enveloping circle of the adjoining inner intake and mowing drum 13. The intake and mowing drums 12 are provided with flat coverings 34.

The deflection of the harvested crop to the rear by the slope conveyor drums 26 is simplified by arc-shaped deflecting skids 36 that are arranged at the bottom of the header 10 between the slope conveyor drums 26 and by a covering 32 arranged above it. The forward ends of the deflecting skids also operate as crop take-out or stripping devices on the inner intake and mowing drums 13. Downstream of the slope conveyor drums 26, crop take-out or stripping devices 36 are provided that extract the harvested crop from the slope conveyor drums 26 and perform a transfer into the intake channel 28 without any friction.

The drive of the intake and mowing drums 11, 12, 13, the transverse conveying drums 24, and the slope conveyor drums 26 is performed by means of appropriate gearboxes from the chopper drum of a forage harvester. During the harvesting process, the header 10 is moved across a field in the direction of operation V. The stalk-like crop to be harvested, if necessarily deflected to the side by stalk dividers 18, is cut by the intake and mowing drums 11, 12, 13 and conveyed into the transverse conveying channel having the rear wall 20. Due to the conveying action of the rear sides of the intake and mowing drums 12, which follow the outer intake and mowing drums 11 downstream, and due to the transverse conveying drums 24 as well as the slope conveyor drums 26, the harvested crop reaches the rear side of the two inner intake and mowing drums 12, where it is deflected to the rear by the deflecting skids and the covering 32. The slope conveyor drums 26 conduct the harvested crop to the intake rolls 30 of the chopper drum of a forage harvester, where it is chopped and deposited in a wagon.

Figure 2:
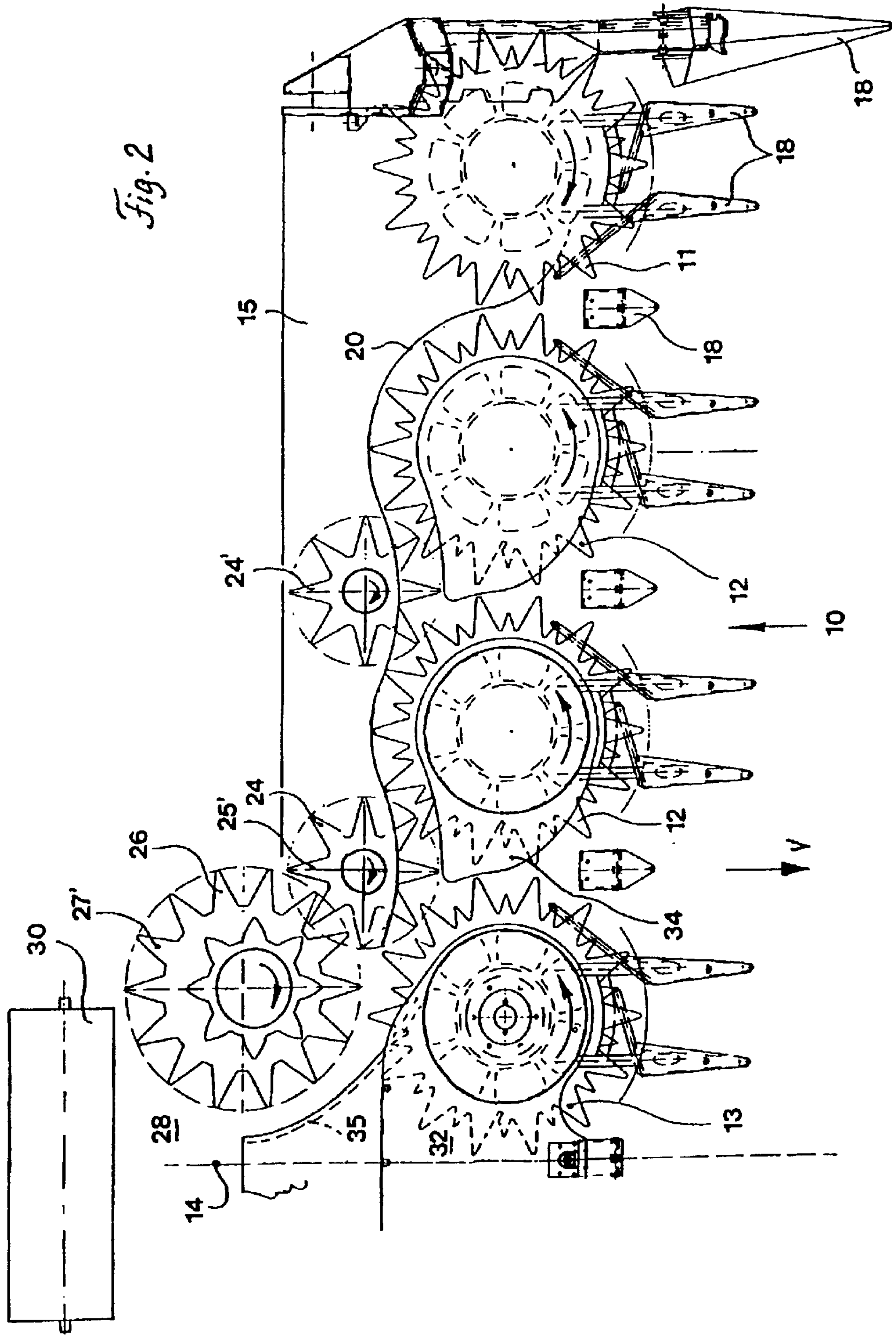
FIG. 2 is a plan view of a crop harvesting header for mowing stalk-like crop constructed in accordance with a second embodiment of the invention.

FIG. 2 shows one-half of a second embodiment of a machine for the harvesting of stalk-like crop that is configured symmetrically about a longitudinal center plane 14. Elements corresponding to the configuration of FIG. 2 are identified with identical number call-outs. The header 10 shown in FIG. 2 is provided with a greater operating width than the machine shown in FIG. 1, since two additional intake and mowing drums 12 are inserted. In each valley region between adjoining intake and mowing drums 12, a transverse conveying drum 24' is arranged whose conveyor disks extend through slots in the rear wall 20. A desired enlargement of the operating width is possible by the addition of further intake and mowing drums 12 and transverse conveying drums 24'.

In contrast to the first embodiment, the slope conveyor drum 26 according to this embodiment does not overlap the enveloping circle of the inner intake and mowing drum 13, but is arranged at a greater distance from the inner intake and mowing drum 13 compared to the first embodiment. In FIG. 2, a deflecting skid 35 can also be seen that is arranged downstream of the inner intake and mowing drum 13 and that deflects the crop to the rear. Such deflecting skids can also be utilized in the other embodiments.

In contrast to the remaining embodiment, the drivers 25' of the transverse conveying drums 24 and the drivers 27' of the slope conveyor drums 26 are triangular in shape in plan view and are configured symmetrically about a radial axis.

The operation of the header 10, according to FIG. 2, corresponds to that of the machine shown in FIG. 1. The crop, harvested by the intake and mowing drums 11, 12, 13, is conveyed through the transverse conveying channel through the rear sides of the intake and mowing drums 12 and through the front sides of the transverse conveying drums 24, 24', and then transported through the rear sides of the inner intake and mowing drums 11 and by means of the deflecting skids 36 and the slope conveyor drums 26 as well as a crop take-out or stripping device associated with it, not shown, into the intake channel 28. Each of the individual intake and mowing drums, 12 and 13, add to the flow of the crop mowed by them in the transverse conveying channel.

Figure 3:
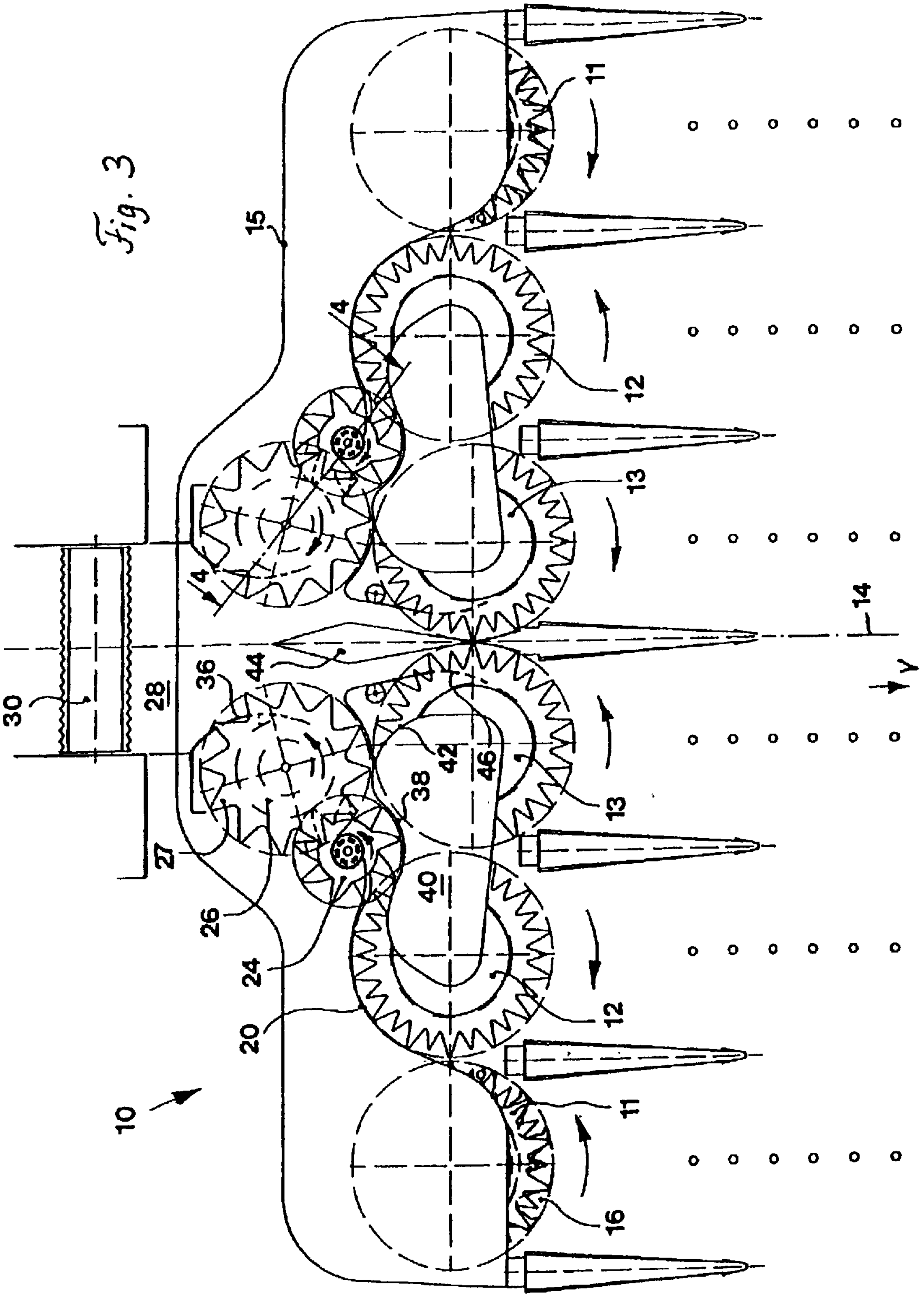
FIG. 3 is a plan view of a crop harvesting header for mowing stalk-like crop constructed in accordance with a third embodiment of the invention.

A third embodiment of a machine for harvesting stalk-like crop is shown in FIG. 3. Elements corresponding to those shown in FIG. 1 are identified by corresponding number call-outs. As in the case of the first embodiment, this embodiment can also be modified in the aforementioned manner into embodiments with greater operating width.

The configuration and the operation of the outer and next inner intake and mowing drums 11 and 12 correspond to that of the first embodiment. The harvested crop is conveyed by the outer intake and mowing drum 11 at first inward and then to the rear, where it is then extracted by a crop take-out or stripping device and taken over by the rear side of the next inner intake and mowing drum 12, which rotates in such a way that the crop is conveyed first to the outside and then to the rear. On the output side, the crop is extracted by a further crop take-out or stripping device from the intake and mowing drum 12 and taken over by a transverse conveying drum 24 arranged behind it. The transverse conveying drum 24 is composed of a cylindrical body with toothed conveyor disks arranged on it one above another. The enveloping circle of the transverse conveying drum 24 overlaps the enveloping circle of the intake and mowing drum 12. The transverse conveying drum 24 does not interact with the rear side of the inner intake and mowing drum 13, but conveys the crop along a fixed wall 38 located ahead of it in the direction of operation V (or a wall that can be moved against a force) that is arranged underneath a covering 40 that covers the intake and mowing drum 12 and the inner intake and mowing drum 13. The crop is then taken over by a slope conveyor drum 26 that is composed of a cylindrical body with toothed conveyor disks arranged above one another. The slope conveyor drums 26 are each provided with an axis of rotation inclined forward and convey the crop to the rear into the intake channel 28 of the chopper drum of a forage harvester with the intake rolls 30 arranged therein above one another. The slope conveyor drums 26 also interact in each case with a wall 42 that is arranged ahead of them and is fixed or can be moved against a force, which is formed by an element fastened to the bottom of the header 10 and which also forms a crop take-out or stripping device 46 for the inner intake and mowing drums 13. A crop take-out or stripping device 36 extracts the crop from the output side of the slope conveyor drum 26.

Thereby, the transverse conveying drum 24 and the slope conveyor drum 26 form a conveying channel for the crop harvested by the outer intake and mowing drums 11, 12 that is separated from the inner intake and mowing drums 13 and is independent of these. In order to attain this conveying channel, without having to deflect the flow of the crop therein in an undesirable manner, and without having to increase the length of the machine as measured in the direction of operation V significantly, at least in the region of the central and outer intake mowing drums 11, 12, the axis of rotation of the inner intake and mowing drums 13 is offset forward in the direction of operation V compared to the other intake and mowing drums 11, 12.

The inner intake and mowing drums 13 rotate in the opposite direction from that of the next outer intake and mowing drums 12, so that they convey the crop at first inward, in the direction toward the longitudinal center plane 14 of the header 10, and then to the rear. The crop harvested by the inner intake and mowing drums 13 is extracted by the crop take-out or stripping devices 46 from the pocket-shaped recesses, flows along a central, approximately lozenge-shaped guide element 44 that is arranged at the bottom of the header 10, and is combined to the side slightly ahead of the slope conveyor drums 26 with the flow of the crop in the conveying channel that originated with the outer intake and mowing drums 11, 12. Following this, the combined flow of crop reaches the intake channel 28.

Figure 4:
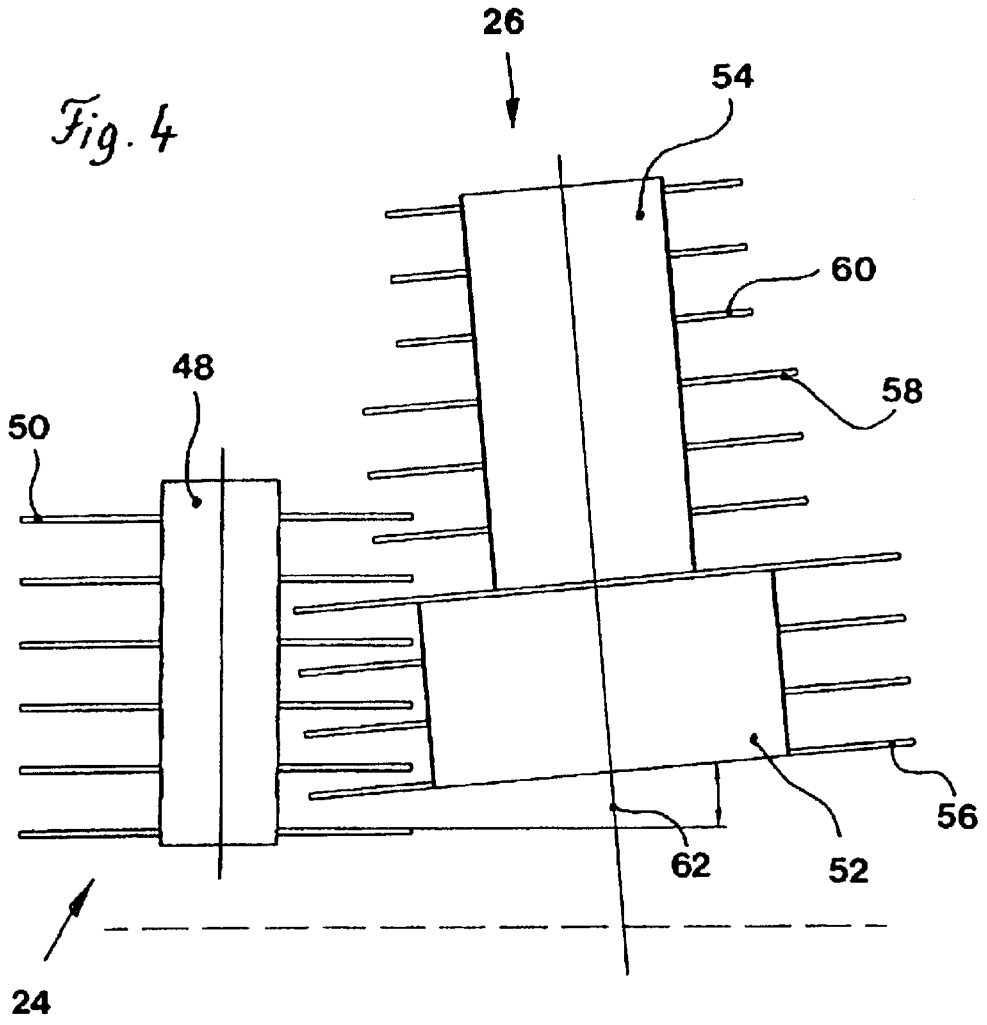
FIG. 4 is a vertical sectional view taken along the lines 4—4 of FIG. 3.

The enveloping circles of the conveyor disks of the transverse conveyor drum 24 and the enveloping circles of the conveyor disks of the slope conveyor drum 26 overlap so that the latter extracts the harvested crop from the transverse conveying drum 24. A separate crop take-out or stripping device for the transverse conveying drum 24 can be eliminated. The cross section shown in FIG. 4, through the transverse conveying drum 24 and the slope conveyor drum 26, clarifies their arrangement to each other and shows that the transverse conveying drum 24 is composed of a cylindrical body 48 and conveyor disks 50 fastened to it and arranged above one another. The slope conveyor drum 26 is provided with a lower cylindrical body 52 and an upper body 54 with a diameter reduced from that of the lower body 52. Conveyor disks 56, 58, 60 with diameters reduced upward step by step are attached to the bodies 52, 54. The axis of rotation 62 of the slope conveyor drum 26 is inclined through an angle of approximately 5° towards the transverse conveying drum 24. The conveyor disks 50 of the transverse conveying drum 24 are each arranged vertically between conveyor disks 56 or 58 of the slope conveyor drums 26. The arrangement of the transverse conveying drums 24 and the slope conveyor drums 26 shown in FIG. 4 can also be applied to the embodiments according to FIGS. 1 and 2.

Having described the preferred embodiment, it will become apparent that various modifications can be made without departing from the scope of the invention as defined in the accompanying claims.

What is claimed is:

1. In a crop harvester header having a cutting width centered along a longitudinal center plane of said header for mowing stalk-like crop and including a support frame, several intake and mowing drums mounted to said frame in side-by-side relationship to each other cooperating for cutting all crop located across said cutting width and then delivering the cut crop to a transverse conveying channel leading towards a central zone of said header centered along said center plane, said several intake and mowing drums including an inner pair having respective enveloping circles located adjacent each other at opposite sides of said center plane, at least one deflecting conveying drum located on each side of said central zone respectively behind said inner pair of said intake and mowing drums and at opposite sides of a fore-and-aft extending crop intake channel, as considered in a forward direction of operation, with said deflecting conveying drums being arranged to take over and further convey the crop, and at least a pair of transverse conveying drums being respectively arranged behind the intake and mowing drums in the direction of operation and being provided for taking over the crop being delivered by at least one of said several intake and mowing drums, wherein each of said at least one pair of transverse conveying drums is associated with a respective intake and mowing drum and has an enveloping circle which overlaps that of said respective intake and mowing drum, the improvement comprising: said enveloping circle of said transverse conveying drum also overlapping an enveloping circle of a respective one of said deflecting conveying drums.

2. The crop harvesting header defined in claim 1 wherein said deflecting conveying drums are slope conveyor drums, each including an axis of rotation that is slightly inclined forward; and said slope conveyor drums bridging a vertical distance between an operating plane of said intake and mowing drums and a plane of operation of said intake channel.

3. The crop harvesting header defined in claim 1 wherein said intake and mowing drums include a second pair of intake and mowing drums respectively located outwardly of said inner pair of intake and mowing drums; and said at least one pair of transverse conveying drums being respectively located at least approximately on a pair of lines of center extending between axes of rotation respectively of said pair of conveying deflecting drums and said second pair of intake and mowing drums.

4. The crop harvesting header defined in claim 3 wherein a cover extends between, and is supported above, said inner pair of intake and mowing drums and includes a central portion extending to the rear between said slope conveying drums and having an edge including a pair of arcuate portions respectively extending arcuately about the axes of rotation of said pair of slope conveyor drums at a distance greater than the respective enveloping circles of said slope conveyor drums; a pair of upright deflecting walls respectively extending downward from said pair of arcuate portions of said edge of said cover so as to respectively define a pair of conveying channels between said pair of slope conveyors and upright deflecting walls; and said at least one pair of conveying drums, said pair of slope conveyors and said pair of inner intake and mowing drums acting together to deliver crop through said pair of conveying channels.

5. The crop harvesting header defined in claim 4 wherein said pair of upright deflecting walls include respective forward end portions that extend within the enveloping circles of said inner pair of intake and mowing drums so as to strip crop from said inner pair of intake and mowing drums.

6. The crop harvesting header as defined in claim 3 wherein a pair of covers is respectively located at opposite sides of said central plane, with one of said pair covers extending between and mounted above one each of said pairs of inner and second intake and mowing drums; and each of said covers including an arcuate edge portion disposed arcuately about a respective one of said pair of conveying drums; and a second arcuate edge portion disposed arcuately about said pair of slope conveyor drums.

7. The crop harvesting header as defined in claim 6 and further including a pair of crop stripping elements respectively extending rearwardly within inner portions of the enveloping circle of said pair of inner intake and mowing drums; and a crop guide element being located along said central plane in a location between, and spaced from, said crop stripping elements, whereby respective crop flow paths are established between said opposite sides of said crop guide element and said pair of crop stripping elements when said inner intake and mowing drums are counter-rotated so as to move mowed crop first inward and then to the rear between said pair of inner intake and mowing drums.

* * * * *